(12) United States Patent
Kausch

(10) Patent No.: US 6,170,859 B1
(45) Date of Patent: Jan. 9, 2001

(54) COVERING FOR A GAS BAG RESTRAINT SYSTEM

(75) Inventor: Armin Kausch, Aalen (DE)

(73) Assignee: TRW Occupant Restraint Systems GmbH & Co. KG, Alfdorf (DE)

(*) Notice: Under 35 U.S.C. 154(b), the term of this patent shall be extended for 0 days.

(21) Appl. No.: 09/202,408

(22) PCT Filed: May 12, 1998

(86) PCT No.: PCT/EP98/02779

§ 371 Date: Dec. 14, 1998

§ 102(e) Date: Dec. 14, 1998

(87) PCT Pub. No.: WO98/51543

PCT Pub. Date: Nov. 19, 1998

(30) Foreign Application Priority Data

May 12, 1997 (DE) .......................................... 297 08 446 U

(51) Int. Cl.[7] .................................................. B60R 21/20
(52) U.S. Cl. ........................ 280/728.3; 280/731; 280/732
(58) Field of Search ............................. 280/728.2, 728.3, 280/731, 732

(56) References Cited

U.S. PATENT DOCUMENTS

| 4,834,421 | * | 5/1989 | Korber et al. .................. 280/732 |
|---|---|---|---|
| 5,398,959 | * | 3/1995 | Avila ............................... 280/728 |
| 5,456,490 | * | 10/1995 | Carter et al. .................. 280/728.3 |
| 5,460,402 | * | 10/1995 | Rhodes, Jr. ................... 280/728.3 |
| 5,653,461 |   | 8/1997 | Fischer . |
| 5,687,989 | * | 11/1997 | Maesing et al. ............... 280/728.2 |
| 5,738,370 | * | 4/1998 | Hosoi et al. .................. 280/731 |
| 5,941,557 | * | 8/1999 | Mullins, Jr. et al. .......... 280/728.2 |
| 5,957,483 | * | 9/1999 | Miltenberger et al. ....... 280/728.3 |
| 5,975,562 | * | 11/1999 | Yamamoto et al. ........... 280/728.3 |
| 5,997,035 | * | 12/1999 | Hirai ............................. 280/743.1 |

FOREIGN PATENT DOCUMENTS

| 195 48 996 | 4/1997 | (DE) . |
|---|---|---|
| 7-069161 | 3/1995 | (JP) . |

* cited by examiner

*Primary Examiner*—J. J. Swann
*Assistant Examiner*—J. Allen Shriver
(74) *Attorney, Agent, or Firm*—Tarolli, Sundheim, Covell, Tummino & Szabo L.L.P.

(57) ABSTRACT

A cover for a gas bag restraint system, with a limiting strap (7) fastened thereto and embedded in the gas bag cover (1) is characterized in that the embedding of the limiting strap (7) into the cover (1) takes place such that the cover (1), when it is held back by the limiting strap (1) in the case of restraint, tears open in a defined manner in the region around the exit place (9) of the limiting strap (7) and remains attached to the limiting strap (7) by a region which is not torn open.

10 Claims, 1 Drawing Sheet

COVERING FOR A GAS BAG RESTRAINT SYSTEM

BACKGROUND OF THE INVENTION

The invention relates to a cover for a gas bag restraint system with a limiting strap fastened thereto and embedded in the gas bag cover.

DESCRIPTION OF THE RELATED ART

In the case of a restraint, when the cover is torn out from its anchorage by the unfolding gas bag, the limiting strap prevents the cover from being able to hit the occupant of the vehicle and from causing injuries. So that the cover also does not hit the windscreen with too great a kinetic energy, hitherto tear seams have been integrated into the limiting strap, which absorb a part of the kinetic energy so that the cover may strike against the windscreen with reduced kinetic energy. The reduction of the kinetic energy by the provision of tear seams additionally has the effect that the stress between the limiting strap and the cover in the region of the exit place of the limiting strap from the cover does not become too great, because otherwise the danger would exist that the limiting strap tears at the exit place. The tear seams, however, make the limiting strap expensive to manufacture.

BRIEF SUMMARY OF THE INVENTION

The invention provides a favourably-priced cover which is simpler to manufacture, the kinetic energy of which is largely reduced during tearing out from its anchorage and unfolding of the gas bag, before the cover hits the windscreen. This is achieved with a cover of the type mentioned above in that the embedding of the limiting strap into the cover takes place such that the cover, when it is held back by the limiting strap in the case of restraint, tears open in a defined manner in the region around the exit place of the limiting strap and remains attached to the limiting strap by a region which is not torn open. By tearing open of the cover, a large part of the kinetic energy of the cover can be reduced. The limiting strap is thereby stressed distinctly less and the energy with which the cover hits against the windscreen is reduced. The cover is only torn open to a predetermined extent, so that a complete detachment of the cover from the limiting strap is prevented.

Preferably, the limiting strap is embedded into the cover by injection-moulding or foaming.

According to a preferred embodiment the defined tearing open can take place in that the cover has an inner surface and the limiting strap has a first section embedded in the cover, in which it has an ever decreasing distance from the inner surface up to its exit place. Thereby, the force necessary for tearing open the cover becomes constantly greater with an increasing length of tearing open.

A second embedded section extending between the free, embedded end of the limiting strap and the first section, in which second section the limiting strap has a constant section from the inner surface, serves for fastening of the cover to the limiting strap after the partial tearing open of the cover.

In a preferred embodiment the limiting strap is embedded such that it peels open the cover up to a predetermined point.

A means for the local limitation of the tearing open process can be formed for example by an integral projection provided on the inner side of the cover.

BRIEF DESCRIPTION OF THE SEVERAL VIEWS OF THE DRAWINGS

Further features and advantages of the invention will be apparent from the following description and from the following drawings, to which reference is made. In the drawings.

DETAILED DESCRIPTION OF THE INVENTION

Figure 1:
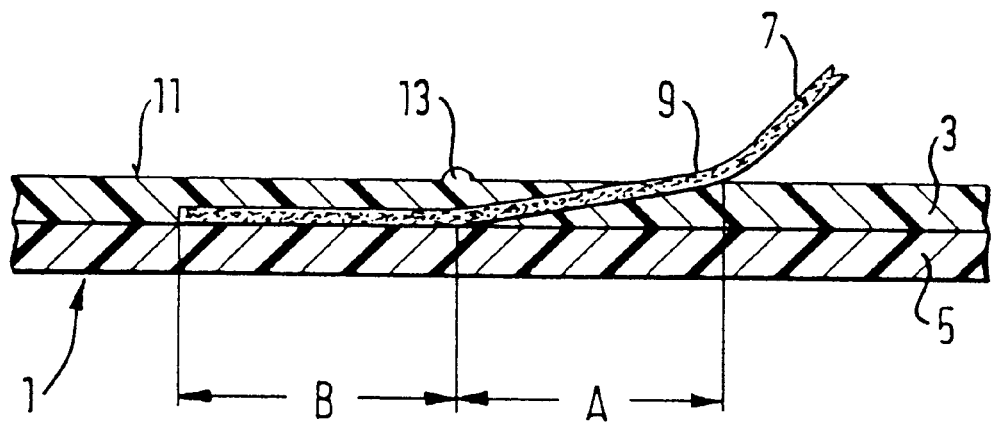
FIG. 1 shows a cross section through a part of the cover according to the invention, in the region of the limiting strap embedding.

In FIG. 1 a two-component cover 1 is shown, which has a carrier layer 3 on the inner side and a cover layer 5 on the outer side. A limiting strap 7 is embedded at one end in the cover 1 by injection-moulding. The limiting strap 7 extends from its exit place 9 from the cover 1 with a constantly increasing distance from the inner surface 11 of the cover 1 to between the layers 3 and 5. The region in which the limiting strap 7 extends through the carrier layer 3 up to the boundary of the layers 3 and 5 is designated as first section A of the limiting strap 7. The adjoining, second section B extending up to the free embedded end of the limiting strap 7 is characterized by a constant distance from the inner surface 11.

A means 13 in the form of a bead-like projection 13, integrally formed on the inner side of the cover by integrally moulding, extends transversely to the longitudinal extent of the limiting strap 7. The width of the means 13 corresponds to that of the limiting strap 7, however, it can also be wider. The means 13 serves for the local limiting of the defined partial tearing open of the cover 1, occurring in the case of restraint, when the cover is torn out from the anchorage.

Figure 2:
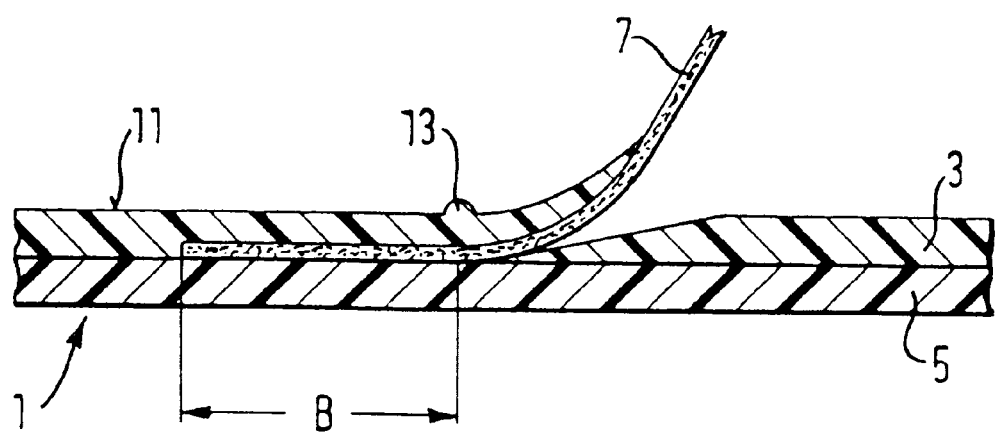
FIG. 2 shows a view, corresponding to FIG. 1, of the cover partially torn open after activation of the gas bag restraint system.

If the cover is thrown towards the windscreen by the unfolding gas bag in the case of restraint, the limiting strap 7 limits the movement of the cover 1. As soon as the limiting strap 7 is loaded to tension to a sufficient extent by the cover 1 which is hurled away, the carrier layer 3 tears open, as shown in FIG. 2, beginning from the exit place 9 in the region of the first section A of the limiting strap 7 and approximately over the width of the limiting strap. Thereby, the kinetic energy of the cover 1 is partly dissipated. The limiting strap 7 peels the cover 1 open over the length of section A until the means 13 is reached, which is arranged at the transition between the sections A and B. The means 13 thereby limits the tearing open process.

Since the limiting strap 7 in section A has an increasingly greater distance from the inner surface 11, the force necessary for tearing open the cover 1 also constantly increases. The cover 1 is thereby not braked abruptly, but constantly, whereby the load on the limiting strap can be reduced.

The embedding of the limiting strap 7 in section B in connection with the means 13 is selected such that a complete tearing out of the limiting strap 7 from the cover 1 is prevented.

What is claimed is:

1. A cover for a gas bag restraint system, with a limiting strap (7) fastened thereto and embedded in the gas bag cover (1), characterized in that the embedding of the limiting strap (7) into the cover (1) takes place such that the cover (1), when it is held back by the limiting strap (7) in the case of restraint, tears open in a defined manner adjacent to an exit place (9) of the limiting strap (7) and remains attached to the limiting strap (7) by a region which is not torn open.

2. The cover according to claim 1, characterized in that the limiting strap is embedded into the cover (1) by one of injection-moulding and foaming.

3. The cover according to claim 1, characterized in that the cover (1) has an inner surface (11) and the limiting strap (7) has a first section (A) embedded in the cover, in which it has an ever decreasing distance from the inner surface (11) up to the exit place (9) of said limiting strap.

4. The cover according to claim 3, characterized in that the limiting strap (7) has a second embedded section (B) extending between its embedded end and the first section (A), in which second section (B) it has a constant distance from the inner surface (11).

5. The cover according to claim 4, characterized in that the cover is a multi-component cover and the limiting strap (7) extends between two components (3, 5) in the region of its second section (B).

6. The cover according to claim 1, characterized in that the limiting strap (7) peels open the cover (1) up to a predetermined point in the case of restraint.

7. The cover according to claim 1, characterized by a means (13) for the local limitation of the tearing open process of the cover.

8. The cover according to claim 7, characterized in that the cover (1) has an inner surface and that the means (13) is an integral projection provided on the inner surface of the cover.

9. The cover according to claim 8, characterized in that the projection extends transversely to the longitudinal extent of the limiting strap (7).

10. The cover according to claim 8, characterized in that the means (13) is provided in the region between the first and the second embedded sections (A, B) of the limiting strap (7) and the limiting strap (7) tears open the cover (1) in the region of the first section (A) in the case of restraint.

* * * * *